No. 787,488. Patented April 18, 1905.

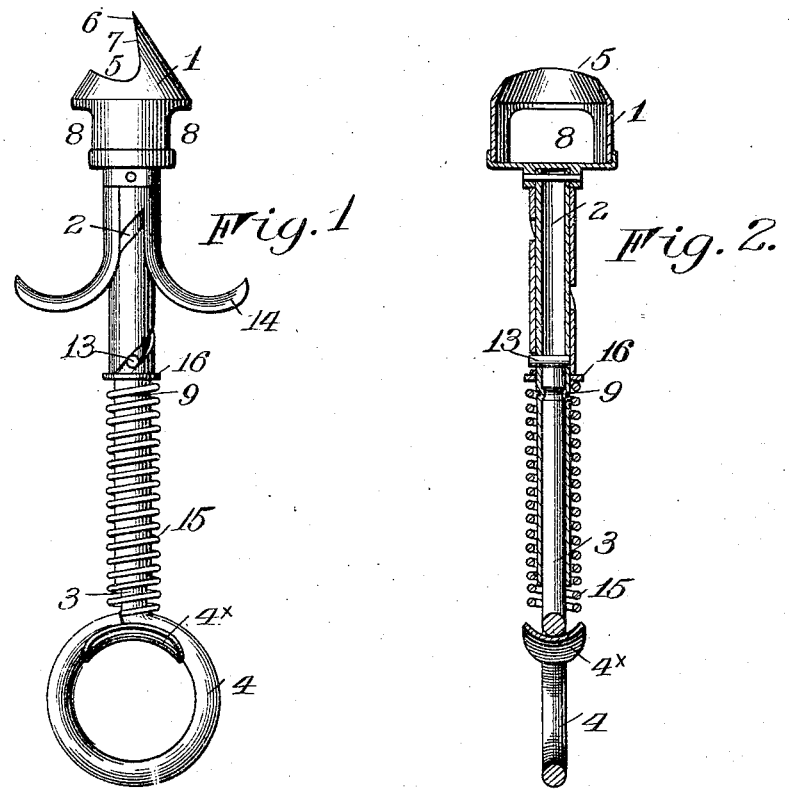

UNITED STATES PATENT OFFICE.

FREDERICK G. YAWMAN, OF ROCHESTER, NEW YORK.

INSTRUMENT FOR REMOVING EYES FROM FRUIT OR VEGETABLES.

SPECIFICATION forming part of Letters Patent No. 787,488, dated April 18, 1905.

Application filed April 30, 1904. Serial No. 205,700.

*To all whom it may concern:*

Be it known that I, FREDERICK G. YAWMAN, of Rochester, in the county of Monroe and State of New York, have invented certain new and useful Improvements in Instruments for Removing Eyes from Fruit or Vegetables; and I do hereby declare the following to be a full, clear, and exact description of the same, reference being had to the accompanying drawings, forming a part of this specification, and to the reference-numerals marked thereon.

My present invention has for its object to provide an instrument for performing such operations as removing the eyes from pine15 apples or spots or the like from fruit or vegetables which shall be simple in construction and capable of rapid and easy operation.

To these and other ends my invention consists in certain improvements and combina20 tion of parts, all as will more fully appear, the novel features being pointed out in the claims at the end of this specification.

In the drawings, Figure 1 is a side elevation of an instrument constructed in accord25 ance with my invention. Fig. 2 is a longitudinal sectional view thereof, and Fig. 3 is a top plan view of the tool.

Similar reference-numerals in the several figures indicate similar parts.

In the present embodiment of my invention, I have shown an instrument comprising a cutting head or tool 1, mounted upon a tubular shaft or shank 2, journaled on the stem of the handle-piece 3 or support, the outer end of which is provided with a loop or eye 4. The latter is adapted to receive the thumb of one of the operator's hands, and for this reason the loop is provided at its inner side with a shield or bearing-plate 4×, adapted to receive the thrust when inserting the tool. As the tool is adapted to cut or excise the material by a rotary action, it is made with the outer conical end as shown, a portion thereof being cut away as indicated at 5, forming the point 6, which is sharpened, as are also the cutting edges 7 diverging therefrom. The base of the tool is cylindrical, and at opposite sides thereof the apertures 8 are provided, through which material severed by the tool may be ejected.

The shank or tubular shaft 2, revolubly mounted on the stem 3, is prevented from removal by means of the inwardly-extending annular rib 9 formed thereon and extending into a circular groove in the stem, as shown in Fig. 2.

In order to revolve the tool, I provide upon the shaft 2 a longitudinally-movable sleeve 11, provided with a helical cam-slot 12, with which coöperates a head or projection 13 on the shaft. The sleeve is also provided with the curved laterally-extending arms 14, adapted to be engaged by the operator's fingers. The sleeve is held in its normal position on the outer end of the shank or shaft 2 by means of the spiral spring 15, one end of which engages the loop 4, while the other abuts against the washer 16, located at the end of the sleeve 11.

In operating the device the operator inserts the thumb of one hand through the eye 4 of the handle and grasps one or both of the arms with the first and second fingers of the same hand. The instrument being then held firmly the tool may be inserted into the fruit or other object, and by drawing the sleeve rearwardly the tool will be caused to revolve, a complete revolution removing the material inclosed within the cone described during the revolution of the cutting edges 7 of the tool.

An instrument embodying my invention consists of few parts, which are simple in construction, and by employing a rotary-operated tool formed in the manner described a shallow or deep cut may be made, as the operator desires, when removing eyes or spots from fruit or vegetables without causing unnecessary waste thereof.

I claim as my invention—

1. An instrument of the class described embodying a tubular shaft and a tool at the outer end thereof having an offset cutting edge, of a handle or support extending into the opposite end of the shaft and having a finger-loop, a longitudinally-movable sleeve on the shaft provided with a helical slot and having a finger projection and a pin on the shaft coöperating with the slot.

2. In an instrument of the class described, the combination with a handle having a stem provided with a loop, a finger-shield arranged therein and a shaft journaled on the stem, of a tool carried on the shaft having an offset cutting edge, a movable member coöperating with the shaft to revolve it and laterally-extending projections on the member.

FREDERICK G. YAWMAN.

Witnesses:
RUSSELL B. GRIFFITH,
CLARENCE A. BATEMAN.